(12) United States Patent
Chandrashekar

(10) Patent No.: US 9,830,088 B2
(45) Date of Patent: Nov. 28, 2017

(54) OPTIMIZED READ ACCESS TO SHARED DATA VIA MONITORING OF MIRRORING OPERATIONS

(71) Applicant: NetApp, Inc., Sunnyvale, CA (US)

(72) Inventor: Girish Chandrashekar, Bangalore (IN)

(73) Assignee: NetApp, Inc., Sunnyvale, CA (US)

(*) Notice: Subject to any disclaimer, the term of this patent is extended or adjusted under 35 U.S.C. 154(b) by 182 days.

(21) Appl. No.: 14/493,094

(22) Filed: Sep. 22, 2014

(65) Prior Publication Data
US 2016/0085460 A1  Mar. 24, 2016

(51) Int. Cl.
*G06F 3/06* (2006.01)
*G06F 12/08* (2016.01)
*G06F 12/0868* (2016.01)

(52) U.S. Cl.
CPC ............ *G06F 3/0617* (2013.01); *G06F 3/067* (2013.01); *G06F 3/0656* (2013.01); *G06F 3/0658* (2013.01); *G06F 12/0868* (2013.01); *G06F 2212/1008* (2013.01); *G06F 2212/1016* (2013.01); *G06F 2212/154* (2013.01); *G06F 2212/163* (2013.01); *G06F 2212/251* (2013.01); *G06F 2212/286* (2013.01); *G06F 2212/314* (2013.01)

(58) Field of Classification Search
CPC ........ G06F 3/067; G06F 3/065; G06F 3/0656; G06F 3/0617; G06F 12/084; G06F 2212/1008; G06F 2212/154; G06F 2212/163; G06F 2212/251; G06F 2212/2532; G06F 3/0659
See application file for complete search history.

(56) References Cited

U.S. PATENT DOCUMENTS

| | | | | |
|---|---|---|---|---|
| 4,503,496 A * | 3/1985 | Holzner | ............... | G06F 13/285 709/212 |
| 7,181,578 B1 * | 2/2007 | Guha | ................... | G06F 3/0607 711/154 |
| 8,966,190 B1 * | 2/2015 | Clark | ..................... | G06F 12/02 711/112 |
| 9,223,518 B1 * | 12/2015 | Emralino | ................ | G06F 3/067 |
| 2003/0158999 A1 * | 8/2003 | Hauck | ................ | G06F 12/0866 711/113 |
| 2012/0311271 A1 * | 12/2012 | Klein | .................. | G06F 12/0873 711/141 |
| 2013/0339600 A1 * | 12/2013 | Shah | ...................... | G06F 3/067 711/114 |
| 2014/0258608 A1 * | 9/2014 | Viswanatha | ........ | G06F 12/0873 711/113 |

* cited by examiner

*Primary Examiner* — Zhuo Li
(74) *Attorney, Agent, or Firm* — LeClairRyan, a Professional Corporation

(57) ABSTRACT

A method and system for optimized read access to shared data via monitoring of mirroring operations are described. A data storage system performs operations that include one controller in a dual-controller host storage appliance in an asymmetric active/active configuration receiving a request from the host for data on a logical unit number owned by the partner controller. The receiving controller, which has a mirror cache of the partner controller's memory for failure recovery, accesses the mirror cache using a data structure that was populated during previous mirror operations. If the data is found in the mirror cache, it is read from the cache and returned to the requesting host without having to contact the partner controller for the data.

15 Claims, 9 Drawing Sheets

OPTIMIZED READ ACCESS TO SHARED DATA VIA MONITORING OF MIRRORING OPERATIONS

TECHNICAL FIELD

Examples described herein relate to data storage systems, and more specifically, to a system and method for optimized read access to shared data via monitoring of mirroring operations.

BACKGROUND

Data storage technology over the years has evolved from a direct attached storage model (DAS) to using remote computer storage models, such as Network Attached Storage (NAS) and Storage Area Network (SAN). With the direct storage model, the storage is directly attached to the workstations and applications servers, but this creates numerous difficulties with administration, backup, compliance, and maintenance of the directly stored data. These difficulties are alleviated at least in part by separating the application server/workstations form the storage medium, for example, using a computer storage network.

These computer storage networks may be configured as high-availability clusters (also known as HA clusters or failover clusters), which are groups of computers that support server applications that can be reliably utilized with a minimum of down-time. They operate by harnessing redundant computers in groups or clusters that provide continued service when system components fail. Without clustering, if a server running a particular application crashes, the application will be unavailable until the crashed server is fixed. HA clustering remedies this situation by detecting hardware/software faults, and immediately restarting the application on another system without requiring administrative intervention, a process known as failover. As part of this process, clustering software may configure the node before starting the application on it. For example, appropriate file systems may need to be imported and mounted, network hardware may have to be configured, and some supporting applications may need to be running as well.

HA clusters are often used for critical databases, file sharing on a network, business applications, and customer services such as electronic commerce websites. HA cluster implementations attempt to build redundancy into a cluster to eliminate single points of failure, including multiple network connections and data storage which is redundantly connected via storage area networks.

In order to provide higher performance in data storage systems connected via storage area networks, write-back caching is used for transferring data from an initiator device to a target device. Write-back caching refers to a method of executing write requests where a host computer transfers write request data to a caching disk array controller, or storage processor (SP), which then transfers the write request data to storage media. Depending upon the particular write-back caching strategy being implemented by the controller, the write request data can either be written immediately to the storage media, or the write request data can be temporarily stored in a cache memory as unwritten or "dirty data" and then "flushed" or written to the storage media at some later point in time. In both cases, the controller sends back status information to the host computer indicating that the write request is complete so that the host computer can continue executing a software application. What is meant herein by the use of the term "dirty data" is data that is located in cache memory which has not yet been written to storage media. The term "flush," (or variants such as "flushed," or "flushing") in context of cache and storage means the act of writing dirty data to storage media.

In bursty host computer environments, such as when the host computer intermittently has a large number of write requests, write-back caching permits the host computer to quickly transfer all of the write request data to cache memory thus increasing the performance of the host computer by reducing the host computer's overhead in executing the large number of write requests. The increased performance of the host computer when utilizing write-back caching is accompanied by an increased risk of data loss in the event of a controller failure or the like which may occur subsequent to sending the host computer status information but prior to actually writing the data to storage media.

Intermediate levels of write request data protection have been developed which involve the use of controller pairs that mirror the write request data for redundancy purposes prior to sending status to the host computer. When using two controllers to mirror write request data, a primary controller receives a write request from a host computer. The primary controller then instructs its pair or partner controller to store a copy of the write request data into a cache memory area of the partner controller for redundancy purposes before the primary controller sends status information to the host computer and before the primary controller places the data on the storage media.

The host computer system has a number of configuration options available for dealing with the problem of one controller failing or being otherwise unreachable by the host. In an active/passive array, a logical unit number (LUN) is "owned" by a primary controller. In the case of primary controller failure, the non-owning standby controller switches from standby to active and takes ownership of the LUN so that I/O can continue as normal. In a symmetric active/active array, also called dual active, both controllers are active simultaneously and either may be used to access the LUN. However, the dual active configuration requires complex locking mechanisms and a supporting infrastructure to ensure data integrity across controllers.

With an asymmetric active/active configuration, also known as asymmetric logic unit access or ALUA, the LUN is reachable across both controllers at the same time. However, only one of these controllers "owns" the LUN and because of that, there will be optimized and unoptimized paths. The optimized paths are the ones with a direct path to controller that owns the LUN. The unoptimized paths have a connection with the controller that does not own the LUN and an indirect path to the controller that does own it via an interconnect channel. Paths for the "non-owning" controller take I/O and send it across this interconnect and advertise themselves as "active (non-optimized)." Despite both controllers being active simultaneously, data reads intended for a LUN sent to the non-owning controller in an ALUA environment have a large performance cost since they must be routed through the owning controller. This can be a significant drain on overall system performance.

DETAILED DESCRIPTION

Figure 1:
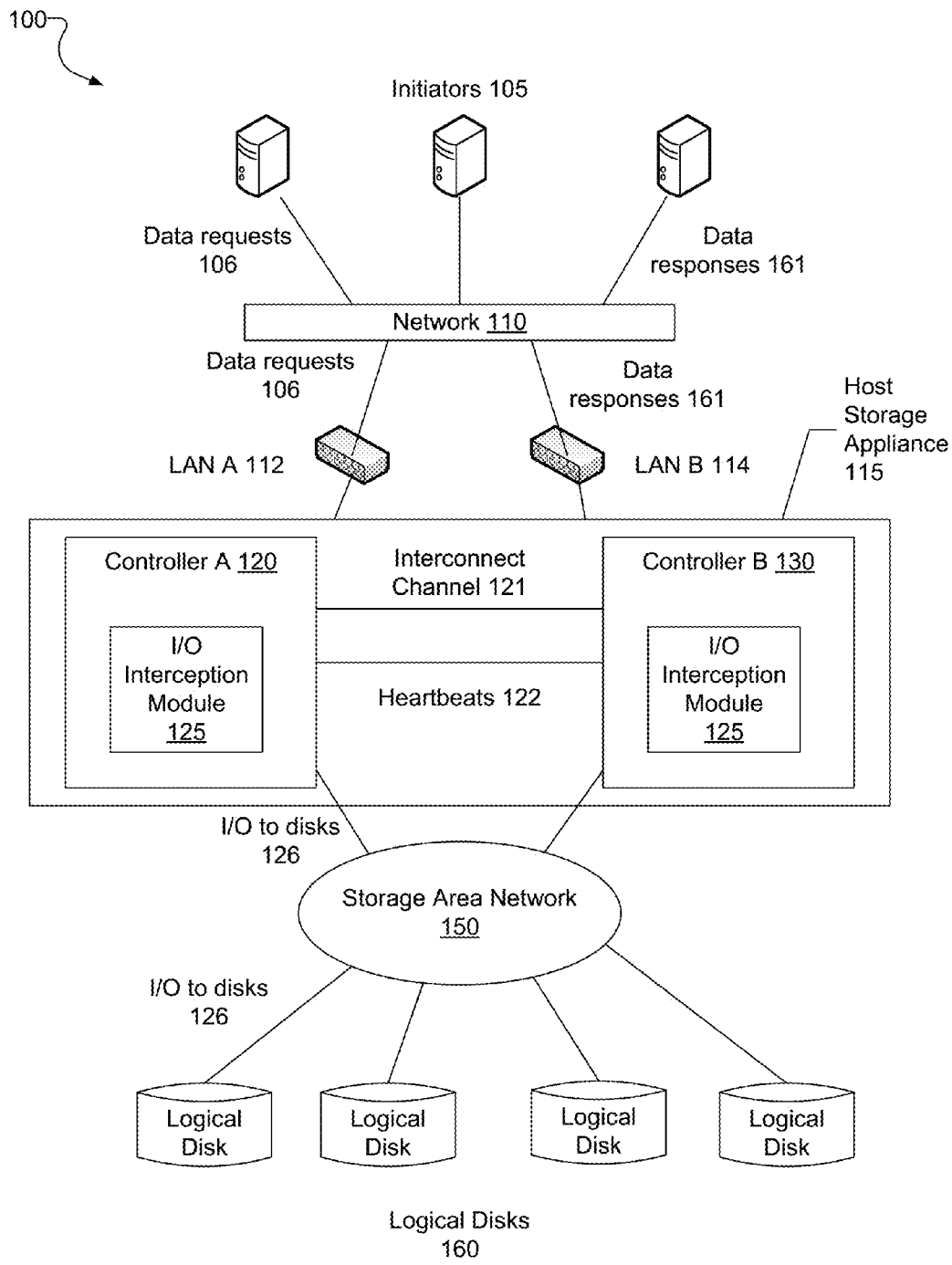
FIG. 1 illustrates an example data storage system with optimized read access to shared data via monitoring of mirroring operations, in accordance with some aspects.

Examples described herein include a computer system to monitor and intercept mirror and unmirror operations in order to use the mirrored data for more efficient read operations on logical number numbers owned by a partner controller in a dual-controller asynchronous active/active storage appliance.

In an aspect, a data storage system performs operations that include one controller in a dual-controller host storage appliance in an asymmetric active/active configuration receiving a request from the host for data on a logical unit number owned by the partner controller. The receiving controller, which has a mirror cache of the partner controller's memory for failure recovery, accesses the mirror cache using a data structure that was populated during previous mirror operations. If the data is found in the mirror cache, it is read from the cache and returned to the requesting host without having to contact the partner controller for the data.

In some aspects, if the data is not found in the mirror cache, the receiving controller performs a read operation as if it owned the LUN (logical unit number). More specifically, the receiving controller may check its own local cache for the data, and if it fails to find it there, read the data from the LUN and return it to the host without routing the request through the partner controller.

In another aspect, if the receiving controller receives a mirror or unmirror operation while a read operation is using the mirror partition of the cache, the receiving controller suspends acknowledgements to the partner controller until the read operation is completed.

In an aspect, the controller receiving the data request is in an Asymmetric Logical Unit Access (ALUA) configuration and does not own the LUN. Therefore, the receiving controller is on the non-optimal path to the LUN and the partner controller which owns the LUN is on the optimal path. The partner controller is the primary controller for storing write request data from the host to the LUN, and the receiving controller is an alternate controller for storing write request data from the host to the LUN.

In a further aspect, the receiving controller receives mirror operations from the partner controller which include a recovery control block containing data associated with the LUN owned by the second controller. The receiving controller uses the recovery control block number to create a cache control block in a data structure in the mirror partition memory area of the receiving controller's cache.

By utilizing the failure recovery mirror cache as a first source for read operations received by a non-owning controller, the performance of an asymmetric active/active disk array can approach that of a symmetric active/active disk array without the same need for complex locking mechanisms and a supporting infrastructure. Through the use of the existing cache, there is no significant memory footprint or performance loss for other operations. In addition, the method works with existing ALUA architectures with no layout changes, retains the ALUA ownership concept, and avoids distributed locking mechanisms.

The term "optimal" and variants thereof mean to intelligently improve a desired metric or result, often at the expense of another metric or result which is deemed less important to the functioning of the method or system.

The terms "programmatic," "programmatically," or variations thereof mean through execution of code, programming or other logic. A programmatic action may be performed with software, firmware or hardware, and generally without user-intervention, albeit not necessarily automatically, as the action may be manually triggered.

One or more aspects described herein may be implemented using programmatic elements, often referred to as modules or components, although other names may be used. Such programmatic elements may include a program, a subroutine, a portion of a program, or a software component or hardware component capable of performing one or more stated tasks or functions. As used herein, a module or component can exist in a hardware component independently of other modules/components, or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more aspects described herein may be implemented through the use of instructions that are executable by one or more processors. These instructions may be carried on a non-transitory computer-readable medium. Machines shown in figures below provide examples of processing resources and non-transitory computer-readable media on which instructions for implementing one or more aspects can be executed and/or carried. For example, a machine shown in one or more aspects includes processor(s) and various forms of memory for holding data and instructions. Examples of computer-readable media include permanent memory storage devices, such as hard drives on personal computers or servers. Other examples of computer storage media include portable storage units, such as CD or DVD units, flash memory (such as carried on many cell phones and tablets), and magnetic memory. Computers, terminals, and network-enabled devices (e.g. portable devices such as cell phones) are all examples of machines and devices that use processors, memory, and instructions stored on computer-readable media.

Asymmetric logic unit access (ALUA) is a small computer systems interface (SCSI) standard that allows multiple controllers to route input/output (I/O, e.g., data reads and writes) to a given logical unit. A logical unit number, or LUN, is a number used to identify a logical unit, which is a device addressed by the SCSI protocol or protocols which encapsulate SCSI, such as Fibre Channel or iSCSI. A LUN may be used with any device which supports read/write operations, such as a tape drive, but is most often used to refer to a logical disk as created on a storage area network (SAN). These LUNs are volumes that are presented to hosts. A non-optimal path is a path that is available to transport I/O, but that may not yield the best performance. An optimal path is a path that is ready to do I/O and should yield the best performance. A storage processor (SP) is used interchangeably with the term "controller." A trespass is a command that allows a controller or its peer/partner controller to take ownership of a LUN. A controller which "owns" a LUN is the controller that is assigned to read and write from the LUN; its partner controller is the "non-owning" controller for that LUN in an ALUA configuration.

FIG. 1 illustrates a data storage system 100 with optimized read access to shared data via monitoring of mirroring operations, in accordance with some aspects. The data storage system 100 includes initiators 105 connected over a network 110 to multiple local area networks (LAN) A 112 and LAN B 114. A host storage appliance 115 may be connected to one or more LANs and storage area networks 150 comprising logical disks 160. Inside the host storage appliance 115 are a pair of controllers, controller A 120 and controller B 130. In some aspects, the dual controllers both run a controller operating system (shown in detail in FIG. 2) containing I/O interception modules 125. Alternatively, the I/O interception module 125 may exist as a separate component connected to the controller operating system. Furthermore, although only one host 115 is illustrated as connected to SAN 150, many hosts 115 may be connected to SAN 150 and access logical disks 160 simultaneously. A data storage system 100 may have more constituent elements than depicted in FIG. 1, which has been simplified to highlight relevant details. Similarly, a host storage appliance 115 can be a proprietary vendor server with pre-installed software or a virtual appliance that can be installed on ordinary commodity hardware. A host storage appliance 115 includes a cache that facilitates a tiered storage approach, allowing quick access to the most active or most recent data from the local system instead of from disks. Appliances may also use features such as data deduplication and compression to use available bandwidth efficiently and move data as quickly as possible.

In some aspects, the initiators 105 send data requests 106 over the network 110 to a host storage appliance 115. In an ALUA environment, the host 115 attempts to retrieve the requested data using the optimized path from a logical unit number (LUN) using whichever controller 120, 130 owns the LUN. Failing that, the host 115 sends its request to the non-owning controller. In the case of write operations, the non-owning controller may transmit the request over an interconnect channel 121 to the owning controller, which handles all I/O to disks 126 through the SAN 150. Whichever controller receives the write operation, a mirror operation is performed on the non-owning controller so that both controllers have a cache of unwritten "dirty data" to use for recovery purposes in case of controller failure. For read operations, data responses 161 are sent back to the initiators 105. If a non-owning controller receives a read operation, its I/O interception module 125 checks the controller's mirror cache for the data, the process by which is explained in detail in FIG. 5. According to some aspects, if the controller fails to find the data in cache, it checks its local cache and/or perform a read on the LUN itself without transmitting the request to the partner controller.

In one aspect, links between the host 115 and SAN 150 are SCSI, fiber channel, or PCI links, although other common bus architectures are contemplated. A virtual disk volume presents a logically contiguous disk representation to the host 115, regardless of the physical location of the recorded data in the SAN 150. For example, a storage controller can stripe regions of sequential data across multiple disks in the disk array to improve performance of accesses. The host 115, however, is presented with a single virtual disk, which it accesses as though it were a single physical disk volume.

During normal operation, both controllers regularly ping each other through heartbeats 122 over the interconnect channel 121 to determine the status of their partner controllers. If one controller detects that the other is not responding, various methods may be employed to take over I/O on the LUNs and ensure data integrity, such as through a trespass or similar command.

Figure 2:
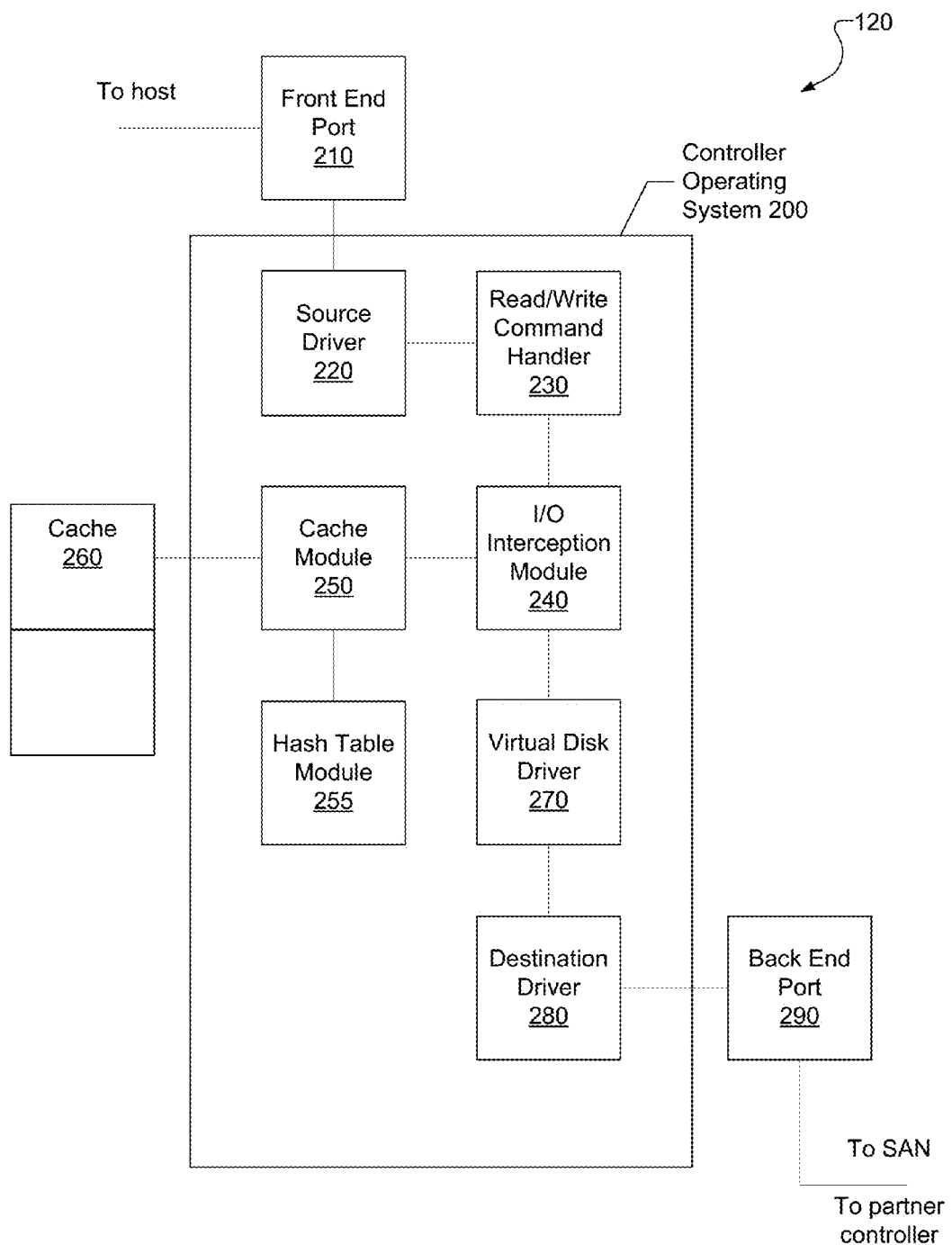
FIG. 2 illustrates an example data storage controller operating system that is operable to monitor and intercept mirroring operations, in accordance with some aspects.

FIG. 2 illustrates a data storage controller operating system 200 and associated ports contained within a controller 120, 130 that is operable to monitor and intercept I/O and mirroring operations, in accordance with some aspects. It should be appreciated that the controller operating system 200 may contain more drivers, modules, and components than illustrated and described herein.

The controller operating system 200 has multiple ports for managing I/O between the host, partner controller, disks, and other devices. Front end port 210 connects to the host computer itself, and it is from this port that the controller operating system 200 receives requests for data and returns the data requested once fetched, either from disk or from a cache. On the other end, the back end port 290 connects to the storage area network that manages the disks and is also used for passing data back and forth between controllers. Therefore, requests for data from disks and the data returned from the disks passes through the back end port 290. The back end port 290 connects the controller to its partner controller for the purposes of cache mirror/unmirror operations and passing of I/O, such as when one controller receives a write request directed at a LUN that its partner controller owns.

It is the role of source driver 220 to take I/O requests from the front end port 210 and delegate them to the correct handlers, such as the read/write command handler 230. When the source driver 220 receives data transfers or acknowledgements from handlers, it sends them back to the host through the front end port 210. In the case of read and write commands, the source driver 220 routes them to the read/write command handler 230, which sits between the source driver 220 and virtual disk driver 270 to transfer data to and from the host. In one aspect, an I/O interception module 240 is coupled to the read/write command handler 230. The I/O interception module 240 intercepts I/O operations within the controller OS 200 while operating in an ALUA environment in order to improve ALUA performance.

In some aspects, the I/O interception module 240 intercepts cache mirror and unmirror operations received from the partner controller through the back end port 290. In a mirror operation, write request data is copied to the partner controller for redundancy and failure recovery purposes prior to sending a status update to the host computer. When using two controllers to mirror write request data, a primary/owning controller receives a write request from a host computer. The primary controller then instructs the cache module 250 of its partner controller to store a copy of the write request data into the cache 260 of the partner controller for redundancy purposes before the primary controller sends status information to the host computer and before the primary controller places the data on the storage media.

After the cached data is flushed to disk by the owning controller, it sends an unmirror command to its partner controller, which instructs the cache module 250 to remove the cached data from the cache 260. In some aspects, the data may not be physically erased from the cache 260, rather, a flag may be set indicating that the cached data is no longer valid.

The I/O interception module 240 may also intercept read operations sent from the read/write command handler 230 when the controller does not own the LUN being read from. In this situation, the I/O interception module 240 sends the addresses that need to be read to the cache module 250, which uses hash table module 255 to perform a hash lookup on the addresses to determine cache control block numbers in the cache 260, which indicate where the data can be found. If found, the cache module 250 retrieves the requested data from the cache 260 and returns it to the read/write command handler 230 for transmission back to the host. Otherwise, if the data is not found in the cache 260, I/O on the LUN proceeds as normal. These methods are explained in further detail in FIGS. 5-7.

Since a virtual disk volume presents a logically contiguous disk representation to the host, regardless of the physical location of the recorded data in the SAN, the virtual disk driver 270 handles translation between the host and the physical location of data in the SAN. Data writes and reads are then passed to the destination driver 280 to control access to the back end port 290 and the SAN itself. The destination driver 280 also ensures that data meant for the partner controller is correctly routed through the back end port 290.

Figure 3:
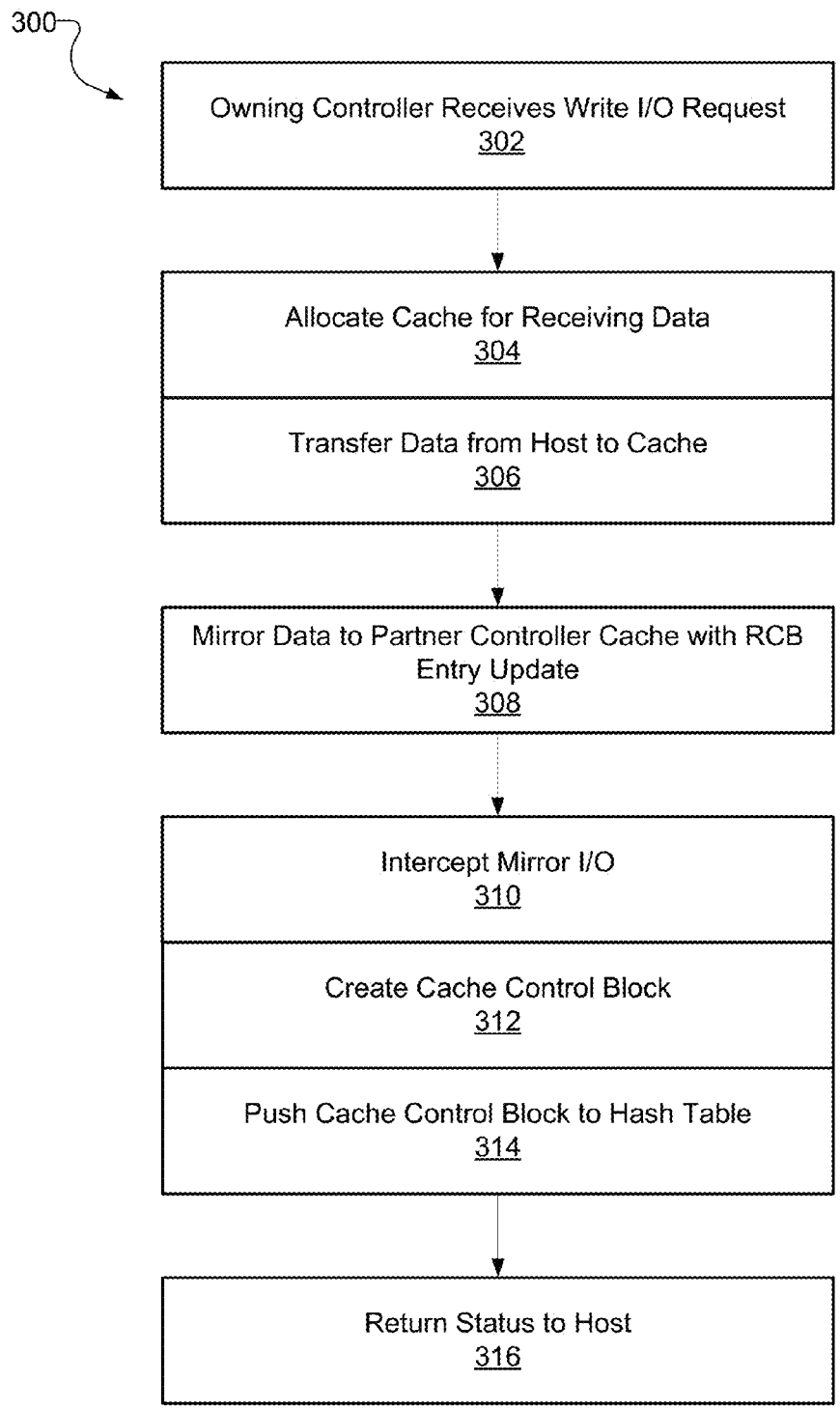
FIG. 3 illustrates an example method for mirroring cache data and intercepting the mirror operation.

FIG. 3 illustrates a method for mirroring cache data from one controller to its partner and intercepting the mirror operation, in accordance with some aspects. While operations of the method 300 are described below as being performed by specific components, modules or systems of the controller operating system 200, it will be appreciated that these operations need not necessarily be performed by the specific components identified, and could be performed by a variety of components and modules, potentially distributed over a number of machines. Accordingly, references may be made to elements of data storage system 100 and controller operating system 200 for the purpose of illustrating suitable components or elements for performing a step or sub step being described. Alternatively, at least certain ones of the variety of components and modules described in data storage system 100 can be arranged within a single hardware, software, or firmware component. It will also be appreciated that some of the steps of this method may be performed in parallel or in a different order than illustrated.

With reference to an example of FIG. 3, a controller receives a data write request for a LUN it owns through, for example, a data storage system 100 as described with FIG. 1 (302). This write request may have been generated by one of the initiators 105 across the network 110, such as another server in a data center or a customer computer. For example, a visitor to a web server on the network 110 may create an account with a website, which triggers a write request to store his credentials to disk. In an ALUA environment, the host computer 115 connected to the SAN 150 then delegates the write request to one of its controllers, preferably the controller which owns the LUN being written to because the owning controller is on the optimal path, which yields the best performance.

The cache module 250 of the owning controller then allocates space in the cache 260 for receiving the data (304). The data being written may be in the form of a buffer data structure so that it can be written to cache and then to disk with minimal or no conversion operations. For performance reasons, data is stored in the cache 260 before being flushed to disk. For example, subsequent read requests for the written data should be significantly faster from the cache 260 than from a disk. In addition, the controller can store multiple writes in the cache 260 then flush them simultaneously, minimizing the load on the disks and the time taken to write the data. Once space in the cache 260 is allocated, the host 115 transfers the data to the controller operating system 200 which stores it in the allocated space in the cache 260 (306).

The cached blocks are then mirrored to the partner controller's cache along with a recovery control block (RCB) entry (308). The cached blocks are transferred from the back end port 290 of the writing control into the back end port 290 of the partner controller, which sends the blocks (and associated RCBs) to its cache module 250 to be mirrored. Each cache block that contains write request data has a corresponding RCB, which is a data structure containing, among other things, metadata associated with the cache block. This metadata provides for the recovery of cache data in the event of a power failure, a controller take-over sequence (e.g., trespass), or in any other situation where data must be recovered, restored, rebuilt, or the like.

Figure 5:
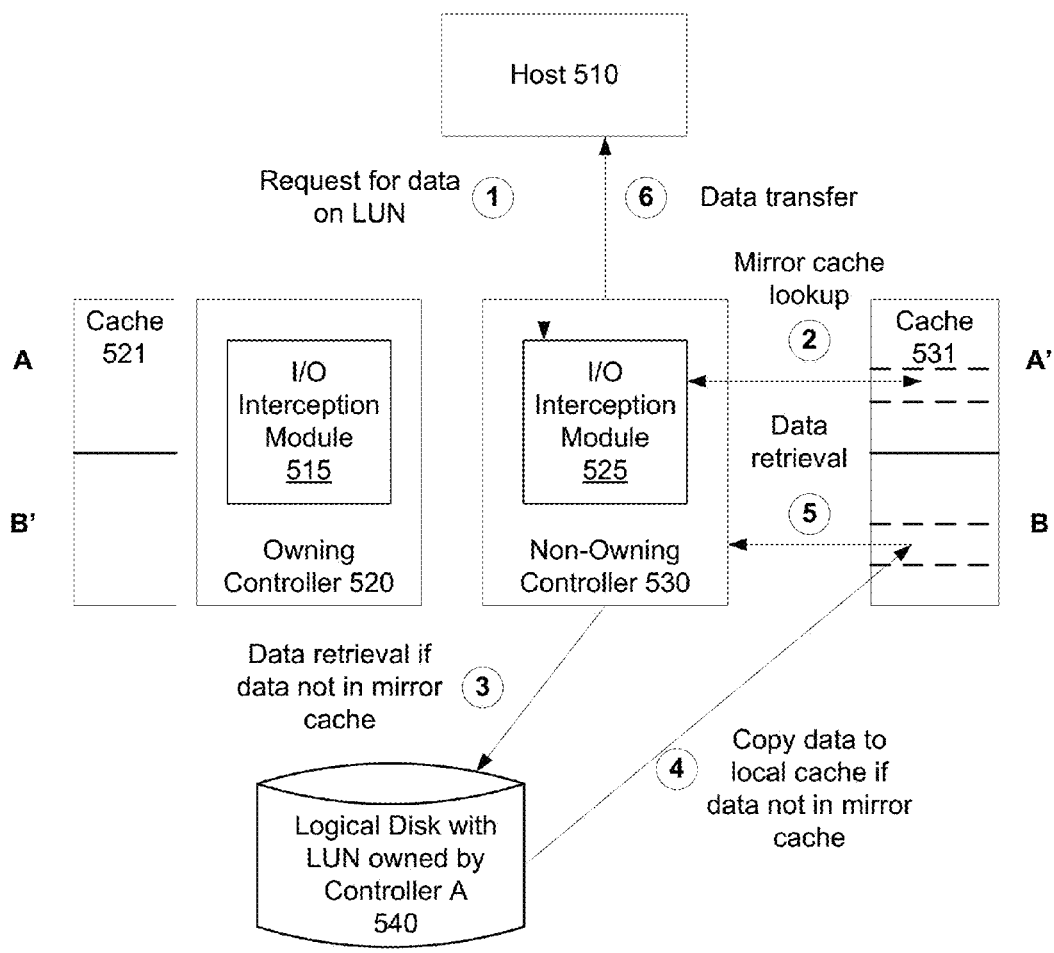
FIG. 5 illustrates an example optimized data read and transfer process on a non-owning controller.
Figure 6:
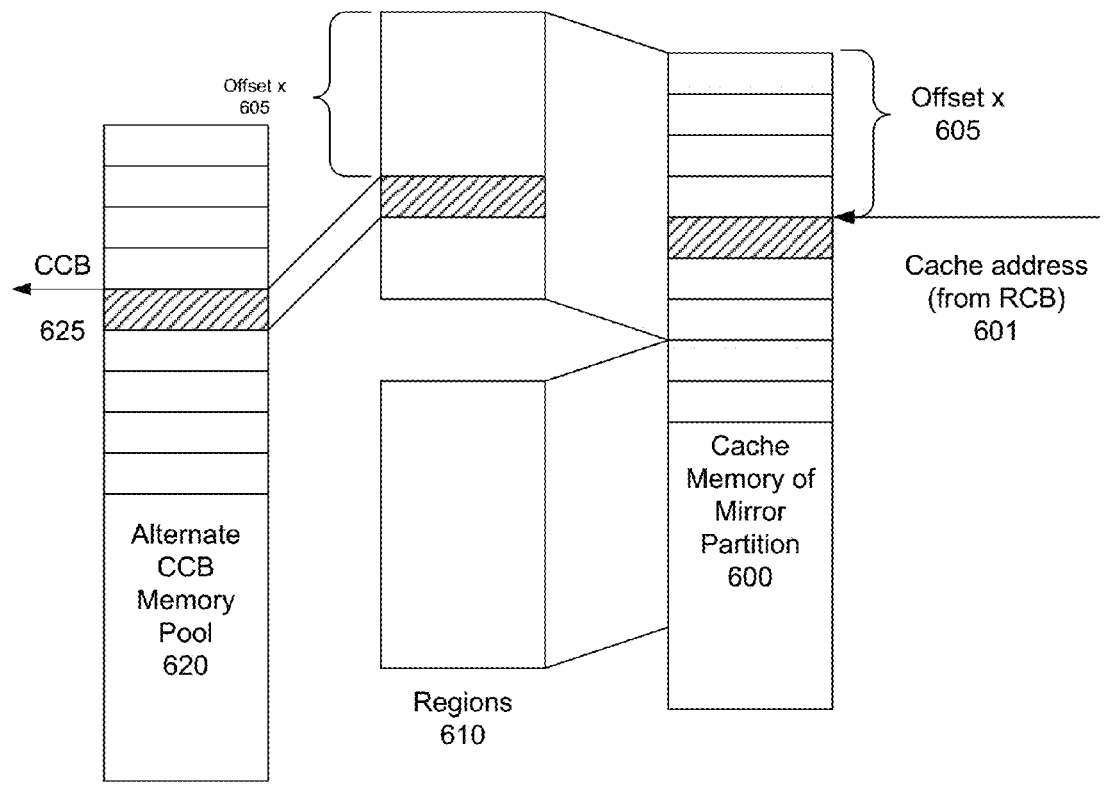
FIG. 6 illustrates a recovery control block to cache control block lookup in a mirror partition of a controller cache.

As discussed in further detail with respect to FIGS. 5 and 6, when the controller mirrors one or more cache blocks containing write request data to its alternate cache memory area, the associated RCB(s) are first mirrored into an alternate controller recovery control block(s). These RCBs correspond to the cache blocks in the alternate cache memory area that contain the mirrored write request data. That is, identical RCBs are maintained and updated for each cache block in the primary and alternate cache memory areas that contain write request data which has not been written to disk.

The mirror operation is intercepted by the I/O interception module 240 in order to create a reverse mapping from cache block addresses to logical block numbers (310). In some aspects, this reverse mapping is used to determine whether specific blocks exist in the cache 260 during non-owned ALUA read operations. Next, the cache block addresses are read from the RCBs and used by the cache module 250 to retrieve statically mapped cache control blocks (CCBs). The hash table module 255 then pushes the CCBs to a hash table used for the reverse mapping (314).

Finally, the original controller returns a status update to the host (316), for example, to signal to the host 115 that the write has been performed successfully. The host 115, however, does not know whether the data was cached or directly written to disk because the controllers are responsible for such details.

Figure 4:
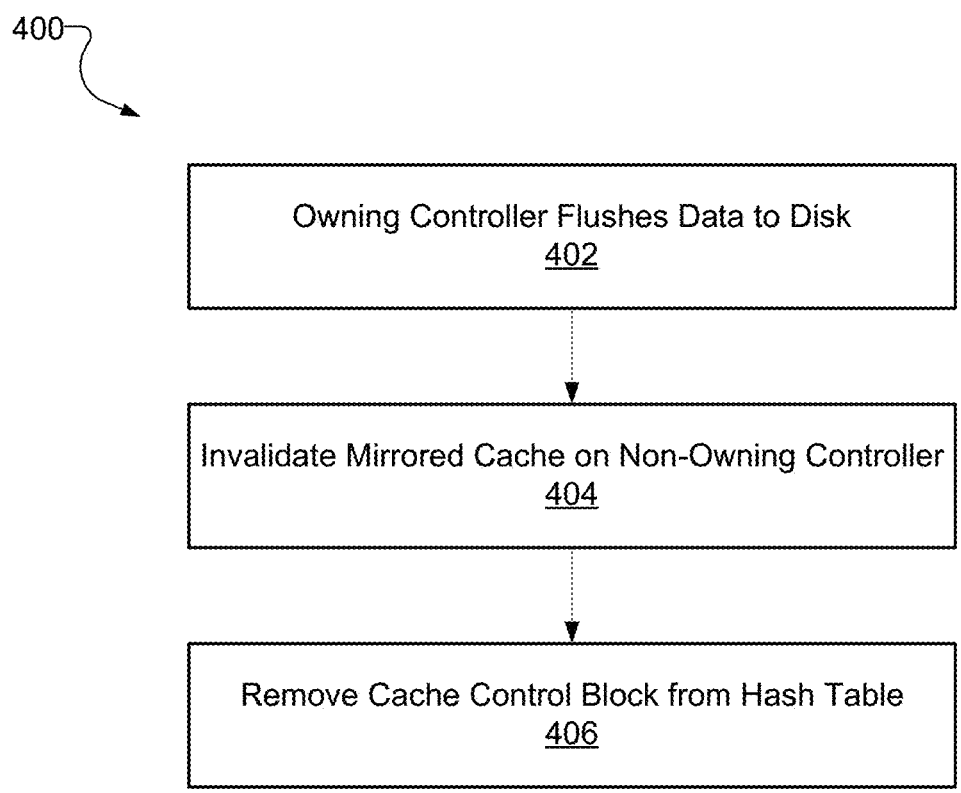
FIG. 4 illustrates an example method for an unmirror operation.

FIG. 4 illustrates a method 400 for an unmirror operation in a controller, in accordance with some aspects. The method 400 may be implemented, for example, by controller operating system 200 as described above with respect to FIG. 2. In contrast to the mirror operation previously described, an unmirror operation has the opposite effect. That is, cached data in the cache 260 is removed or invalidated.

Once a specified condition has been reached, the owning controller's cache module 250 flushes data in the cache 260 to disk (402). For example, the flush may occur when a programmed volume of data is stored in the cache 260 ready to be written. After the cached data is written to disk, it is safe to remove or invalidate the corresponding mirrored data from the partner controller's cache. This is referred to as an unmirror operation. A command is sent through the back end port 290 to the partner controller to invalidate the mirrored data (404). In addition, the hash table module 255 removes the associated cache control block from the hash table so that future look-ups to find data blocks do not erroneously return false positives (406). It should be appreciated that all mirror and unmirror operations are subject to non-owned read synchronization scenarios illustrated in FIG. 8.

With reference to FIG. 5, in a typical ALUA configuration, a logical unit number (LUN) is reachable across both controllers 520, 530 at the same time. However, only one of these controllers "owns" the LUN and because of that, there are optimized and unoptimized paths. The optimized paths are the ones with a direct path to controller 520 that owns the LUN. The unoptimized paths have a connection with the controller 530 that does not own the LUN and an indirect path to the controller 520 that does own it. Paths for the non-owning controller 530 take I/O and route it to the owning controller 520 and advertise themselves as "active (non-optimized)." Despite both controllers being active simultaneously, data reads intended for a LUN sent to the non-owning controller in a typical ALUA environment have a large performance cost since they must be routed through the owning controller 520.

FIG. 5 illustrates an example optimized data read and transfer process on a non-owning controller 530 that may be implemented in a data storage system 100 according to present aspects. For example, the owning controller 520 may correspond to controller A 120 of FIG. 1, the non-owning controller 530 may correspond to controller B 130, and the host 510 may correspond to the host storage appliance 115.

As described above, when the host 510 sends a read request for data from a LUN, it may do so through the owning controller 520, which represents the optimized path. However, due to various problems such as the link to the owning controller 520 being unavailable, the host 510 may be forced to send its read request through non-owning controller 530. In this case, I/O interception module 525 stops the read request from being forwarded to the owning controller 520 and instead checks its cache 531 for the data the host is requesting.

In an ALUA configuration, both controllers 520, 530 have portions of their respective cache memories 521, 531 allocated for use by the other controller. Thus, both controllers 520, 530 function as a primary controller for their respective LUNs and an alternate controller for their partner's LUNs. More specifically, the primary cache memory area 531B is assigned to controller 530 for use during cache read/write requests from the host computer 510, and the alternate cache memory area 531A' is assigned to controller 530 for use in mirroring write request data which is stored in the primary cache memory area 521A of controller 520. Controller 530 is responsible for managing the write request data that it mirrors or stores in the alternate cache memory area 531A'. Likewise, the primary cache memory area 521A is assigned to controller 520 for use during cache read/write requests from the host computer 510, and the alternate cache memory area 521B' is assigned to controller 520 for use in mirroring write request data which is stored in the primary cache memory area 531B of controller 530.

The alternate cache memory areas A' and B' are allocated to the respective controllers during the system configuration phase of start-up operations (Start of Day, or SOD for short). It should be appreciated that the alternate cache memory area A' is assigned the same corresponding memory addresses as assigned to the primary cache memory area A, and that the alternate cache memory area B' is assigned the same corresponding memory addresses as assigned to the primary cache memory area B, thus simplifying mirroring operations by avoiding the need for virtual memory mapping operations.

In some aspects, the alternate cache memory areas do not have to be the same size as the primary cache memory areas. For example, the alternate cache memory area B' has to only be large enough to handle all of the mirrored write request data its partner controller 530 wants to store.

Thus, cache area 531A' of non-owning controller 530 contains the mirrored cache data of 521A, the process of which was described with respect to FIG. 3. The hash table module of the controller OS of non-owning controller 530 takes the block number addresses requested in the read operation to determine whether the blocks requested are located in the mirror cache 531A', and if so, lookup the cache addresses of the cache blocks and return a status update and the data from the mirror cache 531A' to the host 510.

In some aspects, if the hash table module does not find cache control blocks corresponding to the block number addresses for the requested data, the cache module may check the local cache 531B. If the data is also not present there, the read/write command handler proceeds with I/O on the LUN directly rather than sending a request for the data through the owning controller 520 as would happen in a typical ALUA environment. Data from disk is then read into the local cache 531B. Before sending that data back to the host, the cache module once again checks the mirror cache 531A'. For example, it is possible that the owning controller 520 received a write request on the same data blocks and issued a mirror operation subsequent to the last mirror cache check. In that case, the data read from disk is outdated, and the new cached data should be returned to the host 510 instead. Otherwise, if the data is still not present in the mirror cache on the second check, the data read from disk should be returned to the host 510.

With reference to FIG. 6, data is conventionally managed within the cache memory by partitioning at least the primary cache memory area into a number of cache blocks each comprising a predetermined amount of cache memory. Each cache block is further partitioned into a number of contiguous sectors which also comprise a predetermined amount of cache memory. For example, a 2 GB cache memory may be partitioned into 128 cache blocks with each cache block representing 16 MB of cache memory.

When a controller receives a request from the host to write a contiguous block of data to disk, the controller initially determines whether or not the write request data is stored in the primary cache memory area as dirty data (i.e. data not yet written to disk). If dirty data is stored in the primary cache memory area, then the controller overwrites the dirty data with the write request data. If dirty data is not stored in the primary cache memory area, then the controller stores the write request data in available sectors throughout one or more of the cache blocks forming the primary cache memory area. In either case, the controller sets up auxiliary data structures (RCBs) within the primary cache memory area. These RCBs are mirrored to the partner controller along with the cache blocks and contain metadata which defines the type of data stored in the particular cache block represented by the RCBs, what needs to be done with the data stored in the cache block, and where the data goes in the event that the data must be recovered after the occurrence of a fault.

FIG. 6 illustrates a recovery control block to cache control block lookup in a mirror partition of a controller cache. In order to facilitate checking the cache memory of a mirror partition 600 for data, the cache module of the controller OS directly maps memory buffer addresses to associated cache control blocks (CCBs). This allows the controller to track mirror data efficiently to reduce impact on owned writes. During controller boot time, a static mapping is made between mirror data blocks and CCBs, which are data structures tracking data blocks. In some aspects, no allocation or freeing of mirror partition CCBs is performed during runtime. Instead, all CCBs are pre-allocated during boot.

Whenever mirror data is intercepted by the I/O interception module, corresponding CCBs tracking mirror data blocks are retrieved from memory through the static address mapping lookup. Specifically, cache addresses 601 from RCBs received with the mirror data are used as an index into a table of an otherwise unused portion of the cache memory 600 being delegated for this purpose. This index can be seen in FIG. 6 as offsetx605. In some aspects, in order to conveniently handle alignment and split boundaries across blocks, a data structure known as a region 610 is utilized. With the offsetx605 from the RCB, the cache module retrieves the correct CCBs from the alternate CCB memory pool 620, which the hash table module then pushes to the hash table for later use in non-owned read lookups. During an unmirror operation, these CCBs are removed from the hash table. Mirror overwrites make in-place replacement of CCBs in the hash table.

Figure 7:
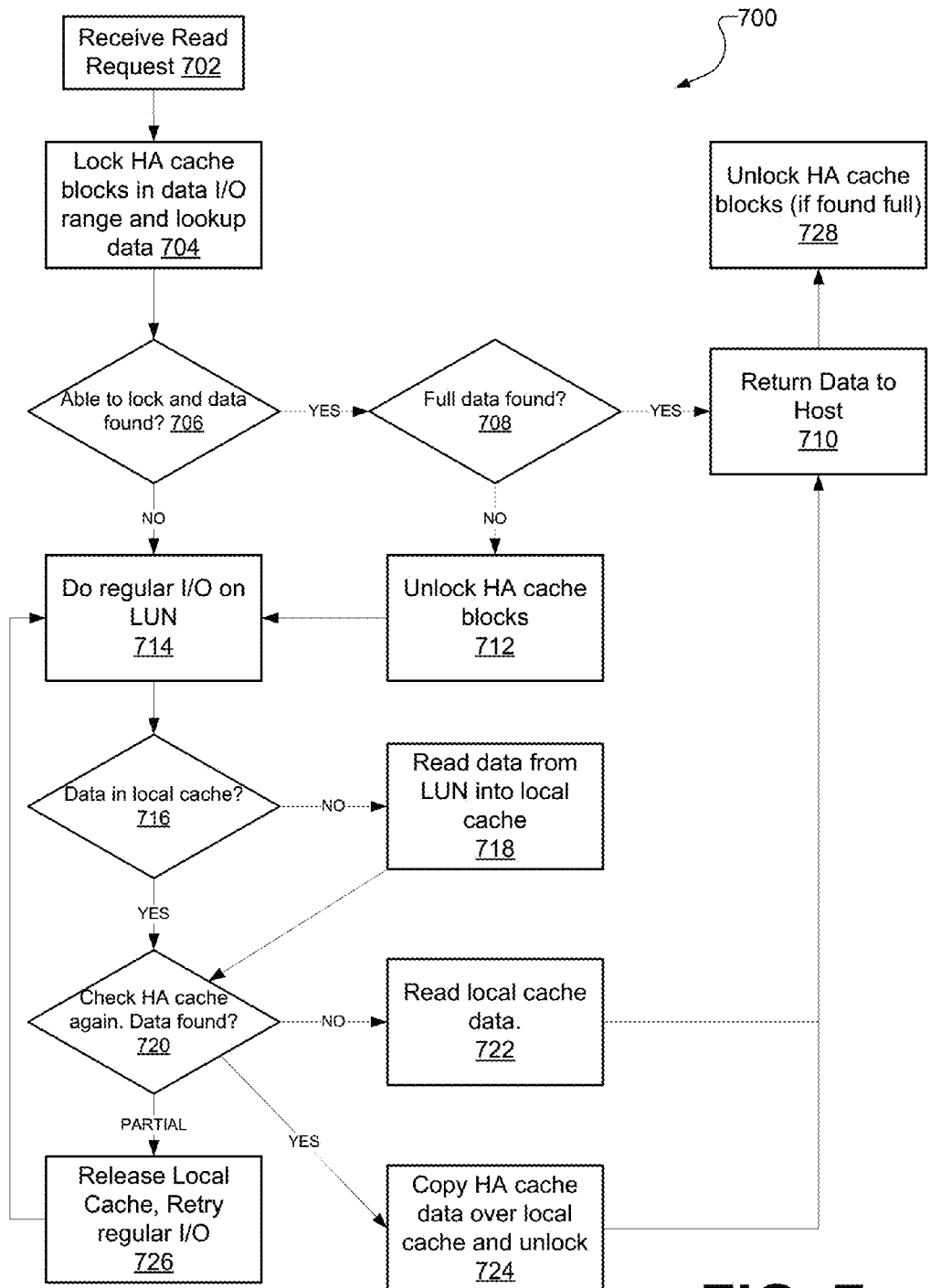
FIG. 7 illustrates an example method for optimized read access to shared data via monitoring of mirroring operations, in accordance with some aspects.

FIG. 7 illustrates a method 700 for optimized read access to shared data via monitoring of mirroring operations, in accordance with some aspects. In an ALUA two-controller host environment, a controller receives a read request from the host for a LUN owned by its partner controller (702). However, rather than send the read quest to the partner controller for I/O as would be typical with ALUA, the receiving controller checks its mirror cache and local cache for the data, and if not found, performs I/O from the disk itself.

First, the receiving controller locks the mirror cache blocks in the data I/O range and checks for the presence of the requested data (see FIG. 5) (704). A determination is then made whether the locking process was successful and the data was found in the mirror cache (706). If both are true, a further determination is made whether the entirety of the requested data was found in the mirror cache (708). If so, the data is returned to the host (710) and the mirror cache blocks are unlocked if they haven't already been (728).

On the other hand, if only partial data was found, the cache blocks are unlocked (712) so that the partner controller can still perform mirror operations during the method 700. Otherwise, the receiving controller would be more likely to return old data. If the full data was not found or the cache was not able to lock, the receiving controller then performs a regular I/O process on the LUN (714).

As part of the regular I/O process, the controller first checks whether the data is already present in its local cache (716). If it is not, the controller reads the requested data from the LUN and copies it into its local cache (718). Now that the data is in the local cache, another determination is made as to whether the mirror cache contains the requested data (720). This could happen, for example, if an owned write occurred on the owning controller during the method 700 which triggered a mirror operation on the non-owning receiving controller.

If the data is still not present in the mirror cache, the data from the local cache is read (722) and returned to the host (710). However, if the data is in the mirror cache on the second read, the mirror cache data is copied over the local cache data (724) and returned to the host (710). In a third scenario, the data is partially found on the second read. In this case, the local cache is released and regular I/O is retried (726). This may happen when, for example, a mirror operation is underway during the second mirror cache read.

FIGS. 8A-8K illustrate synchronization scenarios that may occur between mirror, unmirror, and read operations when there are concurrent read/write accesses on the same logical block address (LBA) range across the two controllers. In other words, one controller is trying to read cached data while the partner controller is performing a mirror operation on data in the same range as the data being read. In these figures, M represents a mirror operation, U represents an unmirror operation, Rs represents the start of a read operation, and Re represents the end of a read operation.

In some aspects, non-owned reads are protected against owned writes and flushes for a short duration (compared to the read window) during the read usage of the mirror partition. Non-owned reads use the latest data present in the mirror partition after the controller has read data from its local cache. If there is a mirror or unmirror operation while a read is still using the mirror partition, mirror/unmirror acknowledgements are suspended until read usage is complete. At other times, reads do not have any knowledge of owned writes. Finally, non-owned reads have an extra penalty of retry reads in the event that a mirror and unmirror operation both happened within the read window.

Figure 8A:
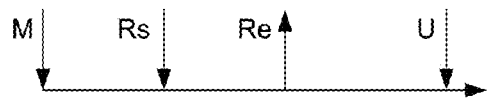
FIGS. 8A-8K illustrate synchronization scenarios that may occur between mirror, unmirror, and read operations.

In FIG. 8A, a read operation starts and ends between a mirror and unmirror. The read should have a partial or complete hit and finish within the mirror-unmirror window. In the event of a partial hit, complete data is fetched from the local cache and mirrored data is copied and overwritten in the return path.

Figure 8G:
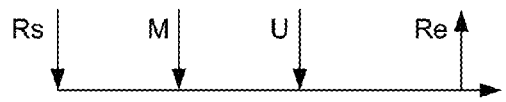
Figure 8B:
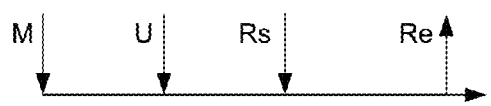
Figure 8H:
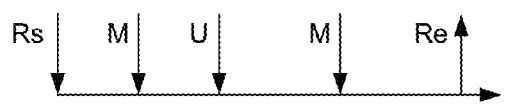

In FIG. 8B, the unmirror operation should invalidate cache blocks in the local cache, and therefore the read should proceed without any hit in the mirror partition.

Figure 8C:
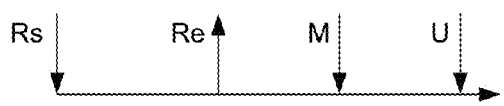

In FIG. 8C, since no data has been mirrored when the read occurs, the read should have no hit in the mirror partition.

Figure 8I:
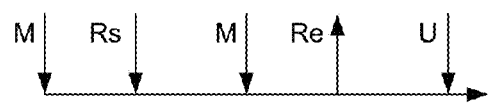
Figure 8D:
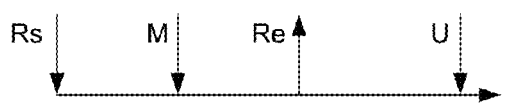

In FIG. 8D, a mirror operation occurs during the read, which should result in a cache hit on the return path. The read should copy and overwrite the data in the local cache.

Figure 8J:
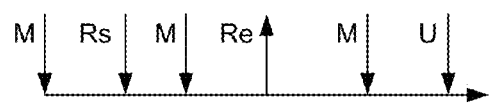
Figure 8E:

In FIG. 8E, the read should have a partial hit due to the unmirror operation occurring during the read. In one aspect, the read should pre-copy available blocks in the issue path and read full from the local cache or disk. In the return path, the controller should copy over pre-copied blocks so that the unmirror should not have any impact.

Figure 8K:
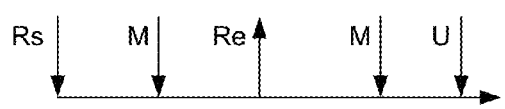
Figure 8F:
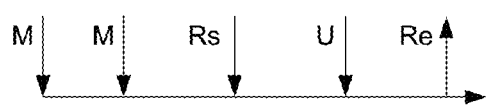

In FIG. 8F, the read should also have a partial hit due to the unmirror operation occurring during the read. In another aspect, the read may track info about the cache hit in the issue path and read full from the local cache or disk. In the return path, if blocks are not available in the mirror partition, the controller should retry the I/O. If the controller finds less data than the original read, it should copy what is available and read the rest from disk.

In FIG. 8G, both a mirror and unmirror operation occur during the read window. Therefore, the read should have no hit as the unmirror invalidated the local cache. The read should instead copy data from the disk.

In FIG. 8H, once again both a mirror and unmirror operation occur during the read window. However, due to the second mirror operation, some data should be available in the return path.

In FIG. 8I, the read should have a partial or complete hit and finish within the mirror-unmirror window. In the event of a partial hit, complete data is fetched from the local cache and mirrored data is copied and overwritten in the return path.

In FIG. 8J, the read should have a partial or complete hit and finish within the mirror-unmirror window, same as FIG. 8I. However, the next mirror operation should be suspended if it happens during the copy process.

In FIG. 8K, the read should find mirror data in the return path and should copy it. If the next mirror operation happens during the copy process, it should be suspended.

Figure 9:
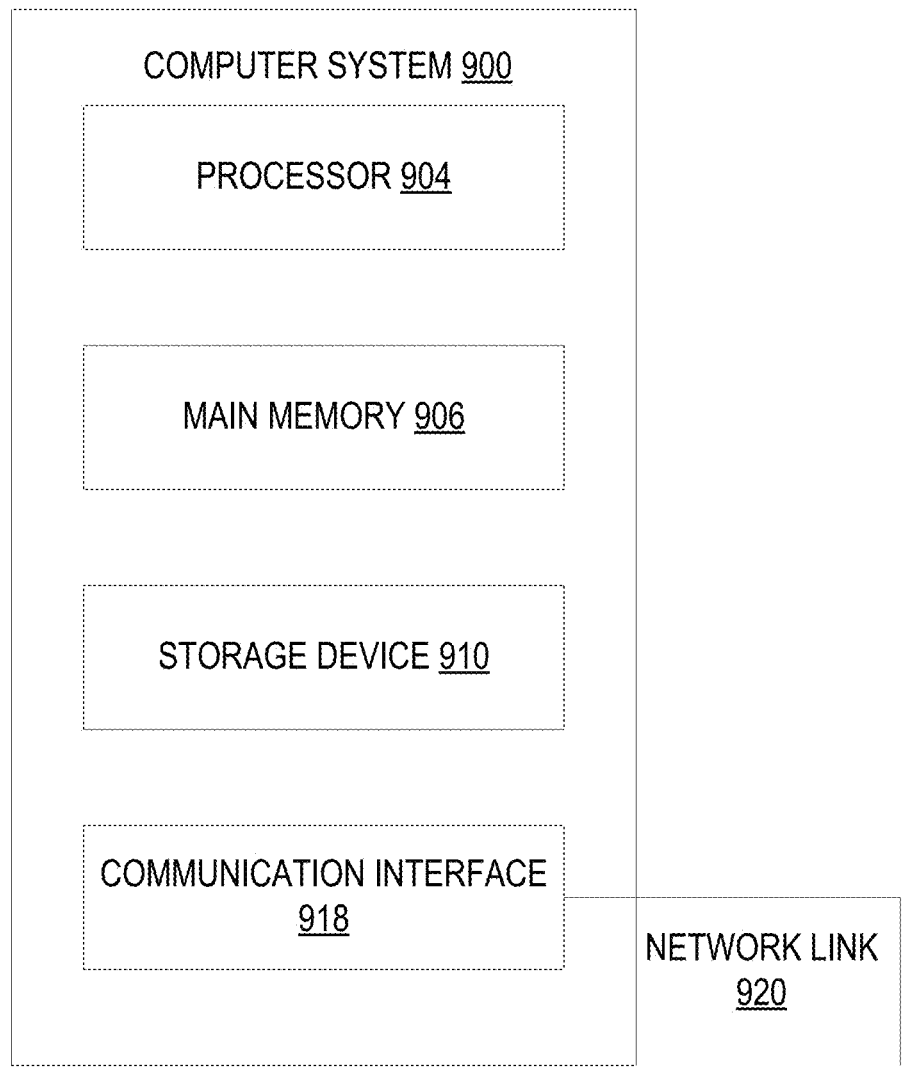
FIG. 9 is a block diagram that illustrates a computer system upon which aspects described herein may be implemented.

FIG. 9 is a block diagram that illustrates a computer system upon which embodiments described herein may be implemented. For example, in the context of FIG. 1, host storage system 115 may be implemented using one or more servers such as described by FIG. 9.

In some aspects, computer system 900 includes processor 904, memory 906 (including non-transitory memory), storage device 910, and communication interface 918. Computer system 900 includes at least one processor 904 for processing information. Computer system 900 also includes the main memory 906, such as a random access memory (RAM) or other dynamic storage device, for storing information and instructions to be executed by processor 904. Main memory 906 also may be used for storing temporary variables or other intermediate information during execution of instructions to be executed by processor 904. Computer system 900 may also include a read only memory (ROM) or other static storage device for storing static information and instructions for processor 904. The storage device 910, such as a magnetic disk or optical disk, is provided for storing information and instructions. The communication interface 918 may enable the computer system 900 to communicate with one or more networks through use of the network link 920 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 900 for implementing the techniques described herein. According to one aspect, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific aspects and details are encompassed by this disclosure. It is intended that the scope of aspects described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A method comprising:
  receiving, by a first controller and from a host, a read request for data that is associated with a logical unit number (LUN) owned by a second controller;
  determining, by the first controller, when the data resides in a failure recovery mirror cache on the first controller that received the read request for the data, wherein the failure recovery mirror cache contains information mirrored from another cache on the second controller that owns the LUN associated with the data;
  returning, by the first controller, the data from the failure recovery mirror cache to the host, wherein the failure recovery mirror cache is a first source for the read request received by the first controller that does not own the LUN associated with the data, when the determining indicates that the data resides in the failure recovery mirror cache on the first controller that received the read request for the data; and
  retrieving, by the first controller, the data from the LUN without accessing the second controller that owns the LUN associated with the data and returning the data to the host, when the determining indicates that the data does not reside in the failure recovery mirror cache on the first controller that received the read request for the data.

2. The method of claim 1, further comprising suspending, by the first controller, one or more acknowledgments to the second controller until the failure recovery mirror cache is no longer being read, when the determining indicates that the data does not reside in the failure recovery mirror cache on the first controller that received the read request for the data.

3. The method of claim 1, wherein the first and second controllers are in an asymmetric active/active configuration.

4. The method of claim 1, wherein the second controller is a primary controller for storing write request data from the host to the LUN, and the first controller is an alternate controller for storing write request data from the host to the LUN.

5. The method of claim 1, further comprising:
  receiving, by the first controller, a mirror operation from the second controller, wherein the mirror operation includes a recovery control block comprising one or more cache block addresses;
  creating, by the first controller, a cache control block associated with the recovery control block based on the cache block addresses; and
  storing, by the first controller, the cache control block in a data structure in a memory area of the failure recovery mirror cache corresponding to the memory of the second controller.

6. A first controller comprising:
  a memory containing machine readable medium comprising machine executable code having stored thereon instructions for optimized read access to shared data;
  a processor coupled to the memory, the processor configured to execute the machine executable code to cause the processor to:
    receive, from a host, a read request for data that is associated with a logical unit number (LUN) owned by a second controller;
    determining when the data resides in a failure recovery mirror cache on the first controller that received the read request for the data, wherein the failure recovery mirror cache contains information mirrored from another cache on the second controller that owns the LUN associated with the data;

return the data from the failure recovery mirror cache to the host, wherein the failure recovery mirror cache is a first source for the read request received by the first controller that does not own the LUN associated with the data, when the determining indicates that the data resides in the failure recovery mirror cache on the first controller that received the read request for the data; and retrieve the data from the LUN without accessing the second controller that owns the LUN associated with the data and return the data to the host, when the determining indicates that the data does not reside in the failure recovery mirror cache on the first controller that received the read request for the data.

7. The computing device of claim 6, wherein the processor is further configured to execute the machine executable code to cause the processor to suspend one or more acknowledgments to the second controller until the failure recovery mirror cache is no longer being read, when the determining indicates that the data does not reside in the failure recovery mirror cache on the first controller that received the read request for the data.

8. The computing device of claim 6, wherein the first and second controllers are in an asymmetric active/active configuration.

9. The computing device of claim 6, wherein the second controller is a primary controller for storing write request data from the host to the LUN, and the first controller is an alternate controller for storing write request data from the host to the LUN.

10. The computing device of claim 6, wherein the processor is further configured to execute the machine executable code to cause the processor to:

receive a mirror operation from the second controller, wherein the mirror operation includes a recovery control block comprising one or more cache block addresses;

create a cache control block associated with the recovery control block based on the cache block addresses; and store the cache control block in a data structure in a memory area of the failure recovery mirror cache corresponding to the memory of the second controller.

11. A non-transitory machine readable medium having stored thereon instructions for optimized read access to shared data comprising machine executable code which when executed by a first controller, causes the first controller to:

receive, from a host, a read request for data that is associated with a logical unit number (LUN) owned by a second controller;

determine when the data resides in a failure recovery mirror cache on the first controller that received the read request for the data, wherein the failure recovery mirror cache contains information mirrored from another cache on the second controller that owns the LUN associated with the data;

return the data from the failure recovery mirror cache to the host, wherein the failure recovery mirror cache is a first source for the read request received by the first controller that does not own the LUN associated with the data, when the determining indicates that the data resides in the failure recovery mirror cache on the first controller that received the read request for the data; and retrieve the data from the LUN without accessing the second controller that owns the LUN associated with the data and return the data to the host, when the determining indicates that the data does not reside in the failure recovery mirror cache on the first controller that received the read request for the data.

12. The non-transitory machine readable medium of claim 11, wherein the machine executable code, when executed by the at least one first controller, further causes the first controller to suspend one or more acknowledgments to the second controller until the failure recovery mirror cache is no longer being read, when the determining indicates that the data does not reside in the failure recovery mirror cache on the first controller that received the read request for the data.

13. The non-transitory machine readable medium of claim 11, wherein the first and second controllers are in an asymmetric active/active configuration.

14. The non-transitory machine readable medium of claim 11, wherein the second controller is a primary controller for storing write request data from the host to the LUN, and the first controller is an alternate controller for storing write request data from the host to the LUN.

15. The non-transitory machine readable medium of claim 11, wherein the machine executable code, when executed by the at least one first controller, further causes the first controller to:

receive a mirror operation from the second controller, wherein the mirror operation includes a recovery control block comprising one or more cache block addresses;

create a cache control block associated with the recovery control block based on the cache block addresses; and store the cache control block in a data structure in a memory area of the failure recovery mirror cache corresponding to the memory of the second controller.

* * * * *